US012448520B2

(12) United States Patent
Golchert et al.

(10) Patent No.: US 12,448,520 B2
(45) Date of Patent: Oct. 21, 2025

(54) PROCESS FOR COLOURING A THERMOPLASTIC POLYMER

(71) Applicant: Röhm GmbH, Darmstadt (DE)

(72) Inventors: Ursula Golchert, Dieburg (DE); Ralf Richter, Hanau (DE); Jörg Kraft, Schoenau (DE); Gerald Dietrich, Alsbach-Haehnlein (DE); Ernst Becker, Bensheim (DE); Stefan Nau, Buettelborn (DE)

(73) Assignee: Röhm GmbH, Darmstadt (DE)

(*) Notice: Subject to any disclaimer, the term of this patent is extended or adjusted under 35 U.S.C. 154(b) by 229 days.

(21) Appl. No.: 18/001,066

(22) PCT Filed: Jun. 9, 2021

(86) PCT No.: PCT/EP2021/065383
§ 371 (c)(1),
(2) Date: Dec. 7, 2022

(87) PCT Pub. No.: WO2021/250052
PCT Pub. Date: Dec. 16, 2021

(65) Prior Publication Data
US 2023/0203313 A1   Jun. 29, 2023

(30) Foreign Application Priority Data

Jun. 10, 2020 (EP) .................................... 20179122

(51) Int. Cl.
*C08J 3/20* (2006.01)
*C08J 3/205* (2006.01)
*C08J 3/22* (2006.01)
*C08K 5/45* (2006.01)
*C09B 39/00* (2006.01)
*C09B 67/20* (2006.01)
*C09B 67/22* (2006.01)

(52) U.S. Cl.
CPC .......... *C09B 67/0063* (2013.01); *C08J 3/203* (2013.01); *C08J 3/2053* (2013.01); *C08J 3/226* (2013.01); *C08K 5/45* (2013.01); *C09B 39/00* (2013.01); *C09B 67/0041* (2013.01); *C08J 2333/12* (2013.01)

(58) Field of Classification Search
CPC . C09B 67/0063; C09B 39/00; C09B 67/0041; C08J 3/203; C08J 3/2053; C08J 3/226; C08J 2333/12; C08K 5/45; C08K 5/23; C08K 5/3417; C08K 5/0041; B29C 45/0013; B29C 48/14; C08L 101/00
See application file for complete search history.

(56) References Cited

U.S. PATENT DOCUMENTS

| 2003/0017326 A1* | 1/2003 | McGurran ................ B32B 7/12 428/323 |
| 2007/0213516 A1 | 9/2007 | Hoellein et al. |
| 2008/0246181 A1* | 10/2008 | Zhu ........................ C08L 51/04 524/495 |
| 2010/0160190 A1* | 6/2010 | Kuvshinnikova ....... C08L 25/14 508/117 |
| 2010/0272960 A1* | 10/2010 | Schultes ................. C08L 33/08 428/156 |
| 2011/0136964 A1 | 6/2011 | Golchert et al. |
| 2012/0157587 A1 | 6/2012 | Meyer et al. |
| 2013/0096244 A1* | 4/2013 | Schwarz-Barac ....... C08L 33/10 264/328.18 |
| 2016/0222185 A1 | 8/2016 | Bockmann et al. |
| 2018/0105677 A1* | 4/2018 | Golchert ................. C08K 5/01 |

FOREIGN PATENT DOCUMENTS

| CN | 1942529 | 4/2007 |
| CN | 101528857 | 9/2009 |
| GB | 1 552 080 | 9/1979 |
| JP | 2016-37518 | 3/2016 |
| JP | 2019-182968 | 10/2019 |
| WO | 2008/049744 | 5/2008 |
| WO | 2010/020474 | 2/2010 |
| WO | 2012/004257 | 1/2012 |
| WO | 2012/080397 | 6/2012 |
| WO | 2015/036526 | 3/2015 |
| WO | 2020/084108 A1 | 4/2020 |

OTHER PUBLICATIONS

Golchert et al., U.S. Appl. No. 18/001,085, filed Dec. 8, 2022.
U.S. Appl. No. 18/001,085, filed Dec. 8, 2022.
International Search Report for PCT Application No. PCT/EP2021/065383, mailed on Aug. 17, 2021, 4 pages.
International Preliminary Report dated Sep. 6, 2022, in PCT/EP2021/065383, 8 pages.
Lanxess, "Quality Shines", Unlimited Colors, Colorants for plastics, Aug. 8, 2017, XP055646753, pp. 1-11.
Pritchard et al., Plastics Additives, an A-Z Reference, G. Springer, 1998, pp. 218-219.
Written Opinion for PCT Application No. PCT/EP2021/065383, mailed on Aug. 17, 2021, 6 pages.

* cited by examiner

*Primary Examiner* — Mark Eashoo
*Assistant Examiner* — Zhen Liu
(74) *Attorney, Agent, or Firm* — Grüneberg and Myers PLLC

(57) ABSTRACT

A process can be used for manufacturing a coloured moulding composition with an improved optical appearance and a particularly high thermal stability. The process involves providing a thermoplastic polymer and adding a colouring preparation, or a liquid composition or a master batch containing the colouring preparation. Injection moulded parts and extruded parts can be composed of the coloured moulding composition.

20 Claims, No Drawings

PROCESS FOR COLOURING A THERMOPLASTIC POLYMER

CROSS-REFERENCE TO RELATED APPLICATIONS

This application is the National Stage entry under § 371 of International Application No. PCT/EP2021/065383, filed on Jun. 9, 2021, and which claims the benefit of priority to European Application No. 20179122.5, filed on Jun. 10, 2020. The content of each of these applications is hereby incorporated by reference in its entirety.

BACKGROUND OF THE INVENTION

Field of the Invention

The present invention relates to a process for manufacturing of a coloured moulding composition with an improved optical appearance and a particularly high thermal stability. The invention also relates to the coloured moulding composition obtainable by the inventive process. The invention further relates to injection moulded parts and extruded parts composed of said coloured moulding composition.

Description of Related Art

Transparent thermoplastic polymers such as polymethyl methacrylate (PMMA), polyesters, polycarbonates and polyamides are commonly coloured in various colours using soluble organic dyes. Typically, perinone-, azo- and anthraquinone-type dyes are used for this purpose due to their commercial availability and bright colours. The term "soluble" as used in the present application indicates that the dye is soluble in the matrix of the thermoplastic polymer in amounts in which it is used for colouring the same. Accordingly, the term "coloured moulding composition" as used herein refers to a thermoplastic composition comprising an organic dye which is uniformly distributed in the matrix of the thermoplastic polymer.

For instance, WO 2012/080397 A2 describes polymeric compositions comprising a transparent thermoplastic material such as polycarbonate and a combination of various colouring agents, inter alia perinone dyes.

WO 2015/036526 A1 teaches a thermoplastic moulding composition consisting of styrene copolymers, carbon black pigments and at least three dyes soluble in the moulding composition. This document also suggests using perinone dyes.

JP 2016-037518 A describes moulded parts made of methacrylic resin composition exhibiting jet-blackness equal to that of a coated part and maintaining its weathering resistance and shielding properties. The composition typically comprises three or more dyes selected from the group consisting of red, yellow, green, blue and violet dyes.

Soluble monoazo dyes, in particular those comprising at least one heteroaromatic moiety, have been used for colouring transparent thermoplastic polymers such as PMMA due to their excellent colour brightness and high weathering stability (Plastics Additives, an A-Z Reference, G. Pritchard et al., Springer, 1998). WO 2010/020474 A1 and WO 2012/004257 A2 describe processes for colouring of thermoplastic polymers such as PMMA with such dyes. Examples of WO 2010/020474 A1 and WO 2012/004257 A2 disclose use of commercially-available dyes Thermoplast® Red 454 (C.I. Solvent Red 195) and Macrolex® Yellow G (C.I. Solvent Yellow 114) for colouring PLEXIGLAS® 8N. The corresponding dyes are commercially available from various manufacturers in form of colouring preparations. Such preparations substantially consist of the corresponding monoazo dyes having a varying chemical purity. Added auxiliary agents increase shelf-life of the colouring preparations and improve their utilization by the customer.

Although commercially available monoazo dyes comprising at least one heteroaromatic moiety offer a number of advantages, their use for colouring of polymers such as PMMA has been limited until now. One of main reasons is a common observation that such dyes often have only a moderate thermal stability and suffer from undesired formation of dark particles at processing temperatures and conditions of the thermoplastic polymer. Sometimes such dark particles are formed already during blending or during manufacturing of a coloured moulding composition. In other cases, formation of dark particles may unexpectedly take place during manufacturing of parts having a complex geometrical shape by injection moulding if a PMMA coloured with a monoazo dye is employed.

Insufficient thermal stability of a coloured moulding composition often leads to undesired colour changes upon exposure to increased temperatures. Therefore, thermal stability of a given moulding composition can often be estimated by measuring the colours in the CIELAB colour space of a sample of such moulding composition before and after exposing it to increased temperatures. The colour difference, i.e. the difference between these two colours can serve as an indicator for the thermal stability. Furthermore, insufficient thermal stability of colouring preparations comprising a monoazo dye may result in the formation of undesired contamination and black particles in the coloured moulding upon exposure to increased temperatures, e.g. during their processing.

SUMMARY OF THE INVENTION

It has therefore been an object of the present invention to provide a process for manufacturing of a thermally stable coloured moulding composition comprising a thermoplastic polymer and a monoazo dye comprising at least one heteroaromatic moiety. In particular, it was desired that said moulding composition has excellent optical properties and remains substantially free of undesired dark particles, even upon exposure to increased temperatures and/or high shearing forces, e.g. during injection moulding of parts having a complex geometrical shape.

Another goal of the present invention was provision of a coloured moulding composition having excellent optical properties and high thermal and weathering stability. Finally, the invention aims to provide coloured moulded parts, in particular those having a complex geometrical shape having these advantageous properties.

The present invention is based on a surprising finding that formation of undesired dark particles in moulding compositions comprising a monoazo dye with at least one heteroaromatic moiety can be efficiently prevented by using colouring preparations, which comprise less than 100 ppm of aluminium compounds and less than 300 ppm of silicon compounds. Since the monoazo dyes with at least one heteroaromatic moiety have an excellent solubility in the employed thermoplastic polymer, a complete and uniform dissolution in the polymer matrix takes place and the resulting coloured moulding composition has excellent optical properties and a low haze.

The term "colouring preparation" as used in the present application refers to a material commercially available from manufacturers as a "dye". A colouring preparation substantially consists of the corresponding monoazo dye having a varying chemical purity and, sometimes, added dispersing agents. Typically, such commercially available dyes exhibit different amounts of several metal ions, e.g. aluminium and silicon. Furthermore, different batches of such commercially available dyes often shows varying metal content. Typically, only the amounts of harmful metals, such as cadmium, mercury and chromium, are specified and controlled.

Without wishing to be bound by theory, the inventors found that compounds of aluminium and silicon, even if present in amounts as low as a few hundred ppm, may form chelate-type chemical complexes with monoazo dyes comprising at least one heteroaromatic moiety. In contrast to free monoazo dyes, such chemical complexes are substantially insoluble in the thermoplastic polymer matrix and lead to undesired formation of dark particles in the resulting moulded parts. In particular, if moulded parts having a complex geometrical shape are manufactured by means of injection moulding, use of increased temperatures is often necessary to ensure a sufficiently low viscosity of the polymer melt. Increased temperatures in combination with high shearing forces during the injection moulding process appear to facilitate formation of such undesired dark particles in presence of aluminium or silicon.

Accordingly, in its first aspect, the present invention is directed to a process for manufacturing of a coloured moulding composition, wherein the process comprises the following steps:

a) providing a thermoplastic polymer; and
b) adding to the thermoplastic polymer from step a) a colouring preparation or an liquid composition or a masterbatch comprising said colouring preparation, wherein the colouring preparation comprises a monoazo dye comprising at least one heteroaromatic moiety; and the colouring preparation comprises
   less than 100 ppm, preferably less than 50 ppm of aluminium or a compound thereof and
   less than 300 ppm, preferably less than 200 ppm of silicon or a compound thereof.

The amount of aluminium and silicon is given above as wt.-ppm based on the total weight of the colouring preparation. For example, the contents of aluminium and silicon given in ppm means mg aluminium or silicon based on kg colouring preparation.

The contents of aluminium and silicon in the colouring preparation can be readily determined by a method such as atom emission spectrometry. For instance, the samples can be digestion mineralized using a microwave pressure digestion system MARS 5 PLUS/MARS 6 and then analysed using an atomic emission spectrometer iCAP™ 7400 ICP-OES Analyzer, available from ThermoFischer Scientific.

According to the present invention the selection of a suitable colouring preparation, having the specific aluminium and silicon content, leads to advantageous coloured moulding compositions obtained by the inventive process, wherein the coloured moulding compositions exhibit high thermal stability and/or low formation of dark particles. If necessary, the chemical purity of the colouring preparation comprising a monoazo dye (e.g. a commercially available dye) can be increased before use by typically known purification steps, such as crystallizing, recrystallizing, chromatography, solid phase extraction.

Preferably, the inventive process encompasses providing a colouring preparation comprising a monoazo dye wherein the colouring preparation comprises less than 100 ppm aluminium and less than 300 ppm silicon, and wherein the colouring preparation can be obtained by one or more purification steps, such as crystallizing, recrystallizing, chromatography, solid phase extraction, etc., if necessary.

In particular the inventive process for manufacturing of a coloured moulding composition includes providing a colouring preparation comprising less than 100 ppm, preferably less than 50 ppm of aluminium or a compound thereof and less than 300 ppm, preferably less than 200 ppm of silicon or a compound thereof. Preferably, providing the colouring preparation includes the determination of the contents of aluminium and silicon in the colouring preparation, e.g. by digestion and wet-chemical or spectroscopic (e.g. via atom emission spectrometry) determination of aluminium and silicon, optionally purification of the colouring preparation, and the selection of a suitable colouring preparation comprising less than 100 ppm, preferably less than 50 ppm of aluminium or a compound thereof and less than 300 ppm, preferably less than 200 ppm of silicon or a compound thereof.

Since the colouring preparation used in the process has a particularly low content of aluminium or a compound thereof and silicon or a compound thereof, the liquid composition or the masterbatch comprising the same normally also comprises less than 100 ppm, preferably less than 50 ppm of aluminium or a compound thereof and less than 300 ppm, preferably less than 200 ppm of silicon or a compound thereof. Again, the contents of aluminium and silicon in the liquid composition or in the masterbatch can be determined by a method such as atom absorption spectrometry.

Additionally, the present invention provides a coloured moulding composition comprising a thermoplastic polymer and a monoazo dye as well as a process for the manufacturing of a moulded or extruded part upon using the same. Since the colouring preparation used in the process has a particularly low content of aluminium or a compound thereof and silicon or a thereof, the coloured moulding composition typically comprises less than 100 ppm, preferably less than 50 ppm of aluminium or a compound thereof and less than 300 ppm, preferably less than 200 ppm of silicon or a compound thereof, determined by atom absorption spectrometry.

DETAILED DESCRIPTION OF THE INVENTION

Monoazo dyes for use in the present invention as such are well-known to a skilled person and are derivatives of diazene (diimide), HN=NH, wherein both hydrogens are substituted by aromatic or heteroaromatic moieties, (IUPAC Recommendations 1995, published in Pure & Appl. Chem., Vol. 67, No. 819, pp. 1307-1375, 1995) In other words, chemical structures of all monoazo dyes comprise one chemical moiety —N=N—.

The term "heteroaromatic moiety" as used in the present application is well-known and typically refers to a 5- or 6-membered aromatic moiety comprising at least one heteroatom in its structure. Normally, the heteroatom is an N, O, S, Se or Te atom, more preferably an N, O or S atom, and still more preferably an N atom. Specific examples of the heteroaromatic moiety include, for example, furan, thiophene, pyran, pyrrole, imidazole, pyrazole, 3H-pyrazol-3-one, pyrazolin-5-one, pyridine, pyrazine, pyrimidine, pyridazine, thiazole, oxazole, isothiazole, isoxazole, thiadiazole, oxadiazole, triazole, selenazole and tellurazole. Further examples of the heteroaromatic moiety include, for example, indolizine, purine, pteridine, carboline, pyrroloimidazole, pyrrolotriazole, pyrazoloimidazole, pyrazolotriazole, pyrazolopyrimidine, pyrazolotriazine, triazolopyridine, tetraazaindene, imidazoimidazole, imidazopyridine, imidazopyrazine, imidazopyrimidine, imidazopyridazine, oxazolopyridine, oxazolopyrazine, oxazolopyrimidine, oxazolopyridazine, thiazolopyridine, thiazolopyrazine, thiazolopyrimidine, thiazolopyridazine, pyridinopyrazine, pyradinopyrazine, pyradinopyridazine, naphthyridine, imidazotriazine and 1H-perimidin.

The heteroaromatic moiety is normally substituted by one or several substituents which may be alkyl, alkenyl, alkynyl, aryl, amino, alkoxyl, aryloxy, acyl, alkoxycarbonyl, aryloxycarbonyl, acyloxy, acylamino, alkoxycarbonylamino, aryloxycarbonylamino, sulfonylamino, sulfamoyl, -carbamoyl, alkylthio, arylthio, sulfonyl, cyano and heterocyclic groups and halogen atoms. More preferable are alkyl, alkenyl, aryl, alkoxyl, aryloxy, cyano and heterocyclic groups and halogen atoms, still more preferably alkyl, aryl, alkoxyl, aryloxy and aromatic heterocyclic groups, and particularly preferably are alkyl, aryl, alkoxyl and aromatic heterocyclic groups.

Specific examples of monoazo dyes for use in the present invention include but are not limited to
Disperse Yellow 241 (5-[(3,4-dichlorophenyl) azo]-1,2-dihydro-6-hydroxy-1,4-dimethyl-2-oxonicotinonitrile),
Solvent Black 3 (2,3-dihydro-2,2-dimethyl-6-((4-(phenylazo)-1-naphthyl)azo)-1H-perimidin),
Solvent Red 195 (cyano-5-[[5-cyano-2,6-bis[(3-methoxypropyl)amino]-4-methylpyridin-3-yl]azo]-3-methyl-2-thiophenecarboxylic acid methyl ester),
Solvent Yellow 16 (5-methyl-2-phenyl-4-phenylazo-4H-pyrazol-3-one),
Solvent Yellow 18 (4-[(2,4-dimethylphenyl) azo]-2,4-dihydro-5-methyl-2-phenyl-3H-pyrazol-3-one),
Solvent Yellow 21 (3-[(1-oxonaphthalen-2-ylidene)methylhydrazinylidene]-1-prop-2-enylindol-2-one),
Solvent Yellow 72 (4-((o-methoxyphenyl) azo)-3-methyl-1-phenyl-2-pyrazolin-5-one),
Solvent Yellow 82, Solvent Yellow 16 (5-methyl-2-phenyl-4-phenylazo-4H-pyrazol-3-one).

In one preferred embodiment of the invention, the monoazo dye is Solvent Red 195. Coloured moulding compositions comprising Solvent Red 195 surprisingly have a significantly higher thermal stability than comparable PMMA-based moulding compositions with other red solvent dyes of the prior art such as e.g. red perinone dyes. Hence, it is advantageous that the thermoplastic moulding compositions of the present invention comprising Solvent Red 195 preferably contain substantially no other red dyes, which are soluble in the polymer matrix. Red dyes within the meaning of the present invention are those designated as Solvent Red, Acid Red or Modern Red according to the colouring index (C.I.). In particular, the thermoplastic moulding compositions of the present invention comprising Solvent Red 195 normally comprise less than 0.1 wt.-%, more preferably less than 0.01 wt.-%, even more preferably less than 0.001 wt.-%, yet even more preferably less than 0.0001 wt.-%, still more preferably less than 0.00001 wt.-%, most preferably less than 0.000001 wt.-% of other red dyes, based on the weight of the coloured moulding composition.

The inventors further found that optical properties and thermal stability of the coloured moulding composition can be even further improved if the colouring preparation has a mass loss in dried form of not more than 15.0 wt.-%, preferably 0.0 to 10.0 wt.-%, more preferably 0.0 to 7.0 wt.-%, even more preferably 0.0 to 5.0 wt.-% and especially preferably 0.0 to 4.0 wt.-% in isothermal thermogravimetric analysis (TGA) at 260° C. for 15 min. When the thermoplastic polymer is substantially transparent, the colouring process can deliver a coloured moulding composition with a haze value below 5%, preferably a below 3%. The haze can be measured according to the standard ASTM D1003 using a sample with a thickness of 3.2 mm. Without wishing to be bound by theory the inventors surprisingly found that colouring preparations having a particularly low mass loss in dried form generate particularly low amounts of by-products which have a low solubility in the thermoplastic polymer and are responsible for haze formation in the final coloured moulding composition.

According to the present invention, the thermoplastic polymer can be coloured directly by addition of the colouring preparation to the uncoloured thermoplastic polymer in the step b) or, alternatively, by addition of a liquid composition or a masterbatch comprising said colouring preparation. If the colouring preparation is added to the thermoplastic polymer as a component of a liquid composition, the liquid composition typically comprises
from 1.0 to 30.0 wt.-%, preferably from 5.0 to 25.0 wt.-%, more preferably from 1.0 to 20.0 wt.-% of a dispersing additive
from 0.5 to 50.0 wt.-%, preferably from 5.0 to 40.0 wt.-% of at least one monoazo dye as described above; and
from 0.0 to 50.0 wt.-%, preferably from 0.0 to 10.0 wt.-%, more preferably from 0.0 to 5.0 wt.-% of auxiliary additives and
liquid such as demineralized water or an organic solvent, where the portions by weight of the components of the liquid composition add up to 100 wt.-%.

Examples of an organic solvent include but are not limited to publicly known organic solvents such as acetone, methyl ethyl ketone, methyl-n-butyl ketone, methyl isobutyl ketone, ethyl isobutyl ketone, tetrahydrofuran, dioxane, dimethylformamide, diethylformamide, dimethylacetamide, diethylacetamide, N-methyl pyrrolidone, methanol, ethanol, isopropanol, ethylene glycol, propylene glycol, 2-methoxy-2-propanol and tetraglyme or mixtures thereof.

The choice of the dispersing additive is not particularly limited as long as the additive does not adversely affect properties of the resulting coloured moulding composition. Use of pH-independent dispersing additives showed to be particularly advantageous in terms of thermal stability of the resulting coloured moulding composition and colour uniformity.

For instance, the dispersing additive may be a high molecular weight copolymer comprising at least maleic anhydride, styrene and an amino polyether as monomer units. Alternatively, the dispersing additive may also be a copolymer of methacrylic acid with hydrophobic methacrylates. The term "hydrophobic methacrylates" as used herein preferably refers to esters of methacrylic acid with alcohols having at least 3 and not more than 24 carbon atoms. Still, the dispersing additive can be a copolymer of polyethers, preferably ethylene oxide, propylene oxide and/or butylene oxide, and styrene oxide.

Suitable dispersing additives include, for example, a polyacrylate Dispex® Ultra 4550 (former EFKA® 4550) which is commercially available from BASF SE. This polymer consists essentially of the monomers α-methylstyrene, 2-ethylhexyl acrylate and MPEG methacrylate. Further examples of suitable dispersing additives are TEGO® Dispers 750W and 755W, available from Evonik Industries AG and Disperbyk® 190 from BYK-Chemie GmbH.

Optionally, in order to minimize undesired yellowing of the moulding composition at increased temperatures, the dispersing additives may be selected in such a way that a mass loss of the dispersing additive in dried form is not more than 15.0 wt.-%, preferably 0.0 to 10.0 wt.-%, more preferably 0.0 to 7.0 wt.-%, even more preferably 0.0 to 5.0 wt.-% and especially preferably 0.0 to 4.0 wt.-% in isothermal thermogravimetric analysis (TGA) at 260° C. for 15 min. The isothermal thermogravimetric analysis is performed by means of an automatic thermal balance such as e.g. Q5000 IR from TA Instruments with a heating rate of 5 K/min up to 260° C. and subsequent isothermal analysis at 260° C. for 15 min. The samples are not conditioned before the analysis but are dried to constant mass in a drying oven before the analysis by TGA. In the case of bead polymers as dispersing aids, the TGA is carried out on the solid bead polymer. In other words, in the case of an aqueous alkaline solution of the bead polymer, the solid bead polymer used to prepare this solution is analysed.

In addition to dispersing additives, the liquid composition may comprise auxiliary additives, for example agents to prevent decay or bacterial decomposition, fungicides, levelling agents, thickeners and defoamers.

In some embodiments, for instance if the liquid composition contains colourants or colourant mixtures insoluble in the liquid phase, especially if their concentrations is less than 10.0 wt.-%, a viscosity adjustment may be advantageous to prevent sedimentation thereof. This is preferably done by adding one or more thickeners. Preferred thickeners include inter alia celluloses, especially ethylcellulose. As a further possibility, carboxylate-containing polymers, which are available as water- or alkali-soluble solid products, as colloidal solutions or as aqueous dispersions, for example homo- and copolymers based on vinyl acetate and crotonic acid or partly hydrolysed poly(meth)acrylates may be used as thickeners. Particular preference is given to homo- and copolymers of acrylic acid and/or methacrylic acid in the form of the sodium salts thereof.

The proportion of the ethylenically unsaturated, free-radically polymerizable carboxylic acid is preferably not less than 6.0 and not more 80.0 wt.-%, preferably from 10.0 to 80.0 wt.-%, especially from 20.0 to 80.0 wt.-%, based on the total weight of the monomers used to prepare the thickeners. Acrylic acid and/or methacrylic acid and maleic acid are preferred.

The comonomers involved in the formation of the thickeners may be ethylenically unsaturated, free-radically polymerizable monomers of high or low water solubility. An advantageous effect is possessed by ethylene and alkyl esters of acrylic acid and/or methacrylic acid, especially having 1 to 4 carbon atoms in the alkyl radical. Other useable comonomers are, for example, styrene, acrylonitrile or vinyl acetate. Comonomers which have higher hydrophilicity or are water-soluble, such as acrylamide and/or methacrylamide or hydroxyalkyl esters of acrylic acid and/or methacrylic acid, may also be used, for example, in proportions totaling about 30.0 wt.-%, preferably up to 10.0 wt.-%, based on the total weight of the monomers used to prepare the thickeners.

The thermoplastic polymer can also be coloured by adding to the thermoplastic polymer from the step a) a masterbatch comprising a colouring preparation. A masterbatch is understood to mean a formulation of the colouring preparation and a polymer moulding material. The concentration of the colouring preparation in the masterbatch is adjusted such that the desired colour impression arises when the masterbatch is used to colour uncoloured thermoplastic polymer from the step a).

The masterbatch added in step b) typically comprises:
from 0.01 to 50.0 wt.-% of the monoazo dye
from 50.0 to 99.99 wt.-% of the thermoplastic polymer
from 0.0 to 30.0 wt.-% of the auxiliary additives
from 0.0 to 10.0 wt.-% of further colourants.

The thermoplastic polymer in the masterbatch is typically the same as the thermoplastic polymer used in step a) and the auxiliary additives may be substantially the same as described above. The choice of the thermoplastic polymer in step a) and in the masterbatch is not particularly limited, as long as the thermoplastic polymer is suitable for colouring and thermoplastic processing, in particular for injection moulding and extrusion. For instance, the thermoplastic polymer may be advantageously selected from the group consisting of polyalkyl (meth)acrylate, polymethylmethacrylimide, polyalkyl (meth)acrylate copolymers, polystyrene, polystyrene copolymer, acrylonitrile copolymers, polycarbonates, polyesters (preferably polyethylene terephthalate), polyamides, polyvinylidene fluoride or a mixture thereof. Preferably, the thermoplastic polymer is selected from the group consisting of polyalkyl (meth)acrylate, polymethylmethacrylimide, polyalkyl (meth)acrylate copolymers, polystyrene, polystyrene copolymer, acrylonitrile copolymers, polycarbonates, polyesters (preferably polyethylene terephthalate), polyvinylidene fluoride or a mixture thereof. More preferably, the thermoplastic polymer is selected from the group consisting of polyalkyl (meth)acrylate, polymethylmethacrylimide, polyalkyl (meth)acrylate copolymers, polycarbonates, or a mixture thereof.

The thermoplastic polymer can also be coloured by adding to the thermoplastic polymer from step a) a colouring preparation as obtained from the manufacturer.

In addition to the components described above the masterbatch or the liquid composition added in step b) may optionally comprise one or more of the following components as further colourants:
at least one further dye selected from perinone dye, quinophthalone dye and anthraquinone dye;
at least one inorganic pigment selected from barium sulphate, zinc oxide, iron oxides, magnesium titanate, calcium sulphate, calcium carbonate, magnesium carbonate, titanium dioxide, carbon black and dolomite;
at least one phthalocyanine pigment; or.
any mixture of the above.

Anthraquinone dyes are dyes having an anthraquinone moiety in their structure. Examples of suitable anthraquinone dyes include (colour index C.I.) Solvent Yellow 117, 163, 167, 189; Solvent Orange 77, 86; Solvent Red 111, 143, 145, 146, 150, 151, 155, 168, 169, 172, 175, 181, 207, 222, 227, 230, 245, 247; Solvent Violet 11, 13, 14, 26, 31, 36, 37, 38, 45, 47, 48, 51, 59, 60; Solvent Blue 14, 18, 35, 36, 45, 58, 59, 59:1, 63, 68, 69, 78, 79, 83, 94, 97, 98, 100, 101, 102, 104, 105, 111, 112, 122, 128, 132, 136, 139; Solvent Green 3, 28, 29, 32, 33; Acid Red 80; Acid Green 25, 27, 28, 41; Acid Violet 34; Acid Blue 25, 27, 40, 45, 78, 80, 112; Disperse Yellow 51; Disperse Violet 26, 27; Disperse Blue 1, 14, 56, 60; Direct Blue 40; Modern Red 3, 11; Modern Blue 8.

Examples of perinone dyes which are suitable for use in the present invention include (colour index C.I.) Solvent Orange 60, 78, 90; Solvent Red 135, 162, 179; Solvent Violet 29 and the like.

Suitable quinophthalone dyes include (colour index C.I.) Solvent Yellow 33, 114, 128, 129, Disperse Yellow 14, 49, 54, Disperse Yellow and the like.

The liquid composition or the masterbatch added in step b) may also comprise at least one inorganic pigment. The inorganic pigment may be, for instance, selected from barium sulphate, zinc oxide, iron oxides, magnesium titanate, calcium sulphate, calcium carbonate, magnesium carbonate, titanium dioxide, carbon black and dolomite. In order to avoid formation of insoluble chemical complexes with the employed monoazo dye it is advantageous that the inorganic pigment comprises, based on the total weight of the inorganic pigment and given in wt.-ppm.

less than 100 ppm, preferably less than 50 ppm of aluminium or a compound thereof and less than 300 ppm, preferably less than 200 ppm of silicon or a compound thereof.

In order to impart the coloured moulding composition black or greyish colours, if desired, a liquid composition or a masterbatch comprising carbon black can be used. Average primary particle size of carbon black pigment is preferably in the range from 5.0 to 100.0 nm, preferably from 7.0 to 60.0 nm. Average particle size $d_{50}$ can be determined by a method known to a skilled person, e.g. by photon correlation spectroscopy according to the standard DIN ISO 13320 upon using a commercially available instrument such as LS 13 320 Laser Diffraction Particle Size Analyzer from Beckman Coulter Inc. It further showed to be advantageous in terms of colouring performance to select carbon black particles having a specific surface area, measured by BET method, standard ISO 9277, of from 50 to 500 m$^2$/g, for instance from 70 to 200 m$^2$/g. The carbon black can be treated or untreated. For example, the carbon black can be treated with specific gases or organic substances, such as, for example, butyllithium. Such treatment allows the surface to be modified or functionalised. This can promote compatibility with the correspondingly used polymeric matrix.

Carbon blacks suitable within the scope of the invention differ from so-called conductive blacks in that they have only low or no electrical conductivity. Compared with the carbon blacks used here, conductive blacks have specific morphologies and superlattices in order to achieve high conductivity. By contrast, carbon black particles used here can very readily be dispersed in thermoplastics so that virtually no cohesive regions of carbon black occur, from which a corresponding conductivity might result. Suitable carbon blacks within the scope of the invention which are obtainable commercially under a large number of trade names and in a large number of forms, such as pellets or powder. For example, suitable carbon blacks are obtainable under the trade names BLACK PEARLS®, in the form of wet-processed pellets under the names ELFTEX®, REGAL® and CSX®, and in a flocculent form under the names MONARCH®, ELFTEX®, REGAL® and MOGUL®-all obtainable from Cabot Corporation. Printex 60, and Printex 90 (Orion Engineered Carbons GmbH) are also suitable.

Preferably, the thermoplastic polymer is substantially transparent. The term "substantially transparent" as used in the present application refers to a material having a transmittance ($D_{65}$) of at least 50%, preferably at least 60%, more preferably at least 70%, even more preferably at least 80% and particularly preferably at least 90%, determined on a sample with a thickness of 2.0 mm according to the standard ISO 13468-2 (2006).

Polyalkyl (meth)acrylates

Polyalkyl (meth)acrylates are usually obtained by free-radical polymerization of mixtures which typically comprise an alkyl (meth)acrylate, typically methyl methacrylate (a), and at least one further (meth)acrylate (b). These mixtures generally comprise at least 50 wt.-%, preferably at least 60 wt.-%, particularly preferably at least 80 wt.-%, and even more preferably at least 90 wt.-%, based on the weight of the monomers, of methyl methacrylate (a). The amount of methyl methacrylate (a) generally used is from 50.0 wt.-% to 99.9 wt.-%, preferably from 80.0 wt.-% to 99.0 wt.-% and particularly preferably from 90.0 wt.-% to 99.0 wt.-%, based on the weight of monomers.

These mixtures for production of polyalkyl (meth)acrylates can also comprise other (meth)acrylates (b) copolymerizable with methyl methacrylate (a). The term "(meth) acrylate" as used herein is meant to encompass methacrylates, acrylates and mixtures thereof. (Meth)acrylates may derive from saturated alcohols, e.g. methyl acrylate, ethyl (meth)acrylate, propyl (meth)acrylate, n-butyl (meth)acrylate, tert-butyl (meth)acrylate, isobutyl (meth) acrylate, pentyl (meth)acrylate and 2-ethylhexyl (meth)acrylate; or from unsaturated alcohols, e.g. oleyl (meth)acrylate, 2-propynyl (meth)acrylate, allyl (meth)acrylate, vinyl (meth)acrylate; and also aryl (meth)acrylates, such as benzyl (meth)acrylate or phenyl (meth)acrylate, cycloalkyl (meth) acrylates, such as 3-vinylcyclohexyl (meth)acrylate, bornyl (meth)acrylate; hydroxyalkyl (meth)acrylates, such as 3-hydroxypropyl (meth)acrylate, 3,4-dihydroxybutyl (meth) acrylate, 2-hydroxyethyl (meth)acrylate, 2-hydroxypropyl (meth)acrylate; glycol di(meth)acrylates, such as 1,4-butanediol (meth)acrylate, (meth)acrylates of ether alcohols, e.g. tetrahydrofurfuryl (meth)acrylate, vinyloxyethoxyethyl (meth)acrylate; amides and nitriles of (meth)acrylic acid etc.

The amount of the (meth)acrylic comonomers (b) generally used is from 0.1 wt.-% to 50.0 wt.-%, preferably from 1.0 wt.-% to 20.0 wt.-% and particularly preferably from 1.0 wt.-% to 10.0 wt.-%, based on the weight of monomers, and the compounds here can be used individually or in the form of a mixture.

The polymerization reaction is generally initiated by known free-radical initiators. Among the preferred initiators are inter alia the azo initiators well known to persons skilled in the art, e.g. AIBN and 1,1-azobiscyclohexanecarbonitrile, and peroxy compounds, such as methyl ethyl ketone peroxide, acetylacetone peroxide, dilauryl peroxide, tert-butyl 2-ethylperhexanoate, ketone peroxide, methyl isobutyl ketone peroxide, cyclohexanone peroxide, dibenzoyl peroxide, tert-butyl peroxybenzoate, tert-butylperoxy isopropyl carbonate, 2,5-bis(2-ethylhexanoylperoxy)-2,5-dimethylhexane, tert-butyl 2-ethylperoxyhexanoate, tert-butyl 3,5,5-trimethylperoxyhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, or mixtures thereof.

The compositions to be polymerized can comprise not only the methyl methacrylate (a) and the (meth)acrylates (b) described above but also other unsaturated monomers which are copolymerizable alone or by employing other monomers that facilitate copolymerization with methyl methacrylate and with the abovementioned (meth)acrylates. Among these are inter alia 1-alkenes, such as 1-hexene, 1-heptene; branched alkenes, such as vinylcyclohexane, 3,3-dimethyl-1-propene, 3-methyl-1-diisobutylene, 4-methyl-1-pentene; acrylonitrile; vinyl esters, such as vinyl acetate; styrene, substituted styrenes having an alkyl substituent in the side chain, e.g. α-methylstyrene and α-ethylstyrene, maleic acid derivatives, such as maleic anhydride, methylmaleic anhydride, maleimide, methylmaleimide; and dienes, such as divinylbenzene.

The amount of these comonomers (c) generally used is from 0.0 wt.-% to 30.0 wt.-%, preferably from 0.0 wt.-% to 15.0 wt.-% and particularly preferably from 0.0 wt.-% to 10.0 wt.-%, based on the weight of monomers, and the compounds here can be used individually or in the form of a mixture.

Further preference is given to polyalkyl (meth)acrylates which are obtainable by polymerization of a composition having, as polymerizable constituents:
  (a) from 50.0 wt.-% to 99.9 wt.-% of methyl methacrylate
  (b) from 0.1 wt.-% to 50.0 wt.-% of an acrylic acid ester of a C1-C4 alcohol
  (c) from 0.0 wt.-% to 30.0 wt.-% of monomers co-polymerizable with the monomers (a) and (b).

In a particularly preferred embodiment, the polyalkyl (meth)acrylate is obtainable by polymerization of a composition whose polymerizable constituents comprise, based on the weight of the polymerizable composition:
  (a) from 80.0 wt.-% to 99.0 wt.-% of methyl methacrylate, and
  (b) from 1.0 wt.-% to 20.0 wt.-% of an acrylic acid ester of a C1-C4 alcohol.

Particular preference is given to polyalkyl (meth)acrylates composed of from 80.0 wt.-% to 99.5 wt. % of methyl methacrylate and from 0.5 wt.-% to 20.0 wt.-% of methyl acrylate, the amounts here being based on 100 wt.-% of the polymerizable constituents. Particularly advantageous copolymers are those obtainable by copolymerization of from 85.0 wt.-% to 99.5 wt.-% of methyl methacrylate and from 0.5 wt.-% to 15.0 wt.-% of methyl acrylate, where the amounts are based on 100 wt.-% of the polymerizable constituents. For instance, the polyalkyl (meth)acrylates may comprise from 85.0 wt.-% to 99.9 wt.-% of methyl methacrylate and from 0.1 wt.-% to 15.0 wt.-% of methyl acrylate, preferably from 95.0 wt.-% to 99.9 wt.-% of methyl methacrylate and from 0.1 wt.-% to 5.0 wt.-% of methyl acrylate, more preferably from 98.0 wt.-% to 99.9 wt.-% of methyl methacrylate and from 0.1 wt.-% to 2.0 wt.-% of methyl acrylate. The Vicat softening points VSP (ISO 306: 2013, method B50) of said polyalkyl (meth)acrylates is typically at least 90° C., preferably from 95° C. to 120° C.

The weight average molecular weight Mw of the polyalkyl (meth)acrylates is generally in the range from 50 000 g/mol to 300 000 g/mol. Particularly advantageous mechanical properties are obtained with polyalkyl (meth)acrylates having a weight average molecular weight Mw in the range from 50 000 g/mol to 200 000 g/mol, preferably from 80 000 g/mol to 180 000 g/mol, in each case determined by means of GPC against PMMA calibration standards and THF as an eluent.

The corresponding copolymers are commercially available under the trademark PLEXIGLAS® from Röhm GmbH.

Poly(meth)acrylimides

The poly(meth)acrylimide (PMMI) which may be used in the present invention comprises at least 30 wt.-%, preferably at least 50 wt.-%, most preferably at least 60 wt.-%, based on the weight of the poly(meth)acrylimide, of repeating units of Formula (I):

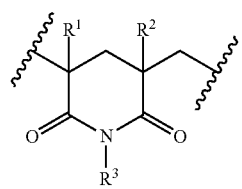

(I)

in which $R^1$ and $R^2$ are independently selected from hydrogen and a methyl group, $R^1$ and $R^2$ being preferably represented by a methyl group, and $R^3$ is hydrogen or a $C_1$-$C_4$-alkyl group, preferably a methyl group.

Manufacturing processes for PMMI are disclosed by way of example in EP-A 216 505, EP-A 666 161 or EP-A 776 910, the entire disclosure of which is incorporated herein by reference.

The starting material used for manufacturing of PMMI comprises a polymer derived from alkyl esters of methacrylic acid and generally composed of more than 50.0 wt.-%, preferably of more than 80.0 wt.-%, particularly preferably of from 95.0 wt.-% to 100.0 wt.-%, of units of alkyl esters of methacrylic acid having from 1 to 4 carbon atoms in the alkyl radical. Methyl methacrylate is preferred. Preferred polymers are composed of at least 80.0 wt.-%, preferably of more than 90.0 wt.-%, more preferably of more than 95.0 wt.-%, still more preferably of more than 99.0 wt.-% of methyl methacrylate, wherein use of neat methyl methacrylate is most preferable. Comonomers that can be used comprise any of the monomers copolymerizable with methyl methacrylate, in particular alkyl esters of acrylic acid having from 1 to 4 carbon atoms in the alkyl radical, acrylo- or methacrylonitrile, acryl or methacrylamide, styrene, or else maleic anhydride. Preference is given to thermoplastically processable polymers of this type whose reduced viscosity is in the range from 20 ml/g to 92 ml/g, preferably from 50 ml/g to 80 ml/g (measured to ISO 8257 (2006), Part 2). They are used in the form of powder or pellets whose median particle size is from about 0.03 mm to 5 mm.

Typically, PMMIs for use in the present invention have a weight average molar weight Mw of from 80 000 g/mol to 200 000 g/mol, preferably from 90 000 g/mol to 150 000 g/mol, determined by GPC using PMMA as a standard. Such materials are commercially available from Röhm GmbH under the trademark PLEXIMID®. Suitable products include but are not limited to PLEXIMID® TT50, PLEXIMID® TT70, PLEXIMID® 8805, PLEXIMID® 8813, PLEXIMID® 8817.

Polycarbonates

Polycarbonates may also be used as thermoplastic polymers in the process of the present invention. Polycarbonates can be considered formally as polyesters formed from carbonic acid and aliphatic or aromatic dihydroxyl compounds. They are readily obtainable by e.g. reacting diglycols or bisphenols with phosgene or carbonic diesters, by polycondensation or transesterification reactions.

Preference is given to polycarbonates which derive from bisphenols. These bisphenols include especially 2,2-bis(4-hydroxyphenyl) propane (bisphenol A), 2,2-bis(4 hydroxyphenyl) butane (bisphenol B), 1,1 bis(4 hydroxyphenyl) cyclohexane (bisphenol C), 2,2'-methylenediphenol (bisphenol F), 2,2-bis(3,5-dibromo-4 hydroxyphenyl) propane (tetrabromobisphenol A) and 2,2-bis(3,5 dimethyl-4-hydroxyphenyl) propane (tetramethylbisphenol A) and mixtures thereof. Typically, such aromatic polycarbonates are prepared by interfacial polycondensation or transesterification. The properties of the polycarbonate can be adjusted to the desired purpose through selection of the bisphenols.

Scattering Particles

In some embodiments of the present invention, the thermoplastic polymer may further comprise organic or inorganic scattering particles dispersed in the matrix of the polymer. Although the choice of the scattering particles is not particularly limited, they are typically selected in such a way that the refractive index of the scattering particles differs from that of the polymer matrix by at least 0.01. The refractive index can be measured at the Na D-line at 589 nm at 23° C. as specified in the standard ISO 489 (1999).

The scattering particles usually have a weight average particle diameter of from 0.01 µm to 100.0 µm. The weight average particle diameter-indicated as so-called volume averaged $d_{50}$-value (that is 50 percent by volume of the particles have a particle size below the specified average particle size) of the scattering particles can be measured in accordance with the standard for laser diffraction measurements ISO 13320-1 (2009). Typically, the size of the scattering particles is determined in each case in dry powder form by laser light scattering (at room temperature, 23° C.) using Beckman Coulter LS 13 320 laser diffraction particle size analyser, tornado dry powder system. The measurement is carried out as described in the manual. For computer-aided analysis model Mie is used.

Inorganic scattering particles may include traditional inorganic opacifiers, e.g. barium sulphate, calcium carbonate, titanium dioxide or zinc oxide.

Organic scattering particles are typically spherical scattering beads consisting of a cross-linked polymeric material such as poly alkyl (meth)acrylates, silicones, polystyrenes etc. For the purposes of the present invention, the term "spherical" means that the scattering beads preferably have a spherical shape, but it is clear to the person skilled in the art that, as a consequence of the methods of production, it is also possible that scattering beads with some other shape may be present, or that the shape of the scattering beads may deviate from the ideal spherical shape. The term "spherical" therefore indicates that the ratio of the largest dimension of the scattering beads to the smallest dimension is not more than 4, preferably not more than 2, each of these dimensions being measured through the centre of gravity of the scattering beads. Based on the number of scattering beads, at least 70% are preferably spherical, particularly at least 90%.

Preferred scattering beads composed of crosslinked polystyrenes are commercially available from Sekisui Plastics Co., Ltd. with the trademarks Techpolymer® SBX-4, Techpolymer® SBX-6, Techpolymer® SBX-8 and Techpolymer® SBX-12.

Other particularly preferred spherical plastics particles which are used as scattering agents comprise cross-linked silicones. Silicone scattering agents particularly preferably used in the present invention are obtainable from Momentive Performance Materials Inc. as TOSPEARL® 120 and TOSPEARL® 3120.

Impact Modifiers

Mechanical properties of the coloured moulding composition may be additionally adjusted to the desired purpose if the thermoplastic polymer comprises an impact modifier. Impact modifiers for use in the present invention per se are well known and may have different chemical compositions and different polymer architectures. The impact modifiers may be crosslinked or thermoplastic. In addition, the impact modifiers may be in particulate form, as core-shell or as core-shell-shell particles. Typically, particulate impact modifiers have an average particle diameter between 20 nm and 500 nm, preferably between 50 nm and 450 nm, more preferably between 100 nm and 400 nm and most preferably between 150 nm and 350 nm. "Particulate impact modifiers" in this context means crosslinked impact modifiers which generally have a core, core-shell, core-shell-shell or core-shell-shell-shell structure. Average particle diameter of particulate impact modifiers can be determined by a method known to a skilled person, e.g. by photon correlation spectroscopy according to the norm DIN ISO 13321:1996.

In the simplest case, the particulate impact modifiers are crosslinked particles obtained by means of emulsion polymerization whose average particle diameter is in the range from 10 nm to 150 nm, preferably from 20 nm to 100 nm, more preferably from 30 nm to 90 nm. These are generally composed of at least 20.0 wt.-%, preferably from 20.0 wt.-% to 99.0 wt.-%, particularly preferably in the range from 30.0 wt.-% to 98.0 wt.-% of butyl acrylate, and from 0.1 wt.-% to 2.0 wt.-%, preferably from 0.5 wt.-% to 1.0 wt.-% of a crosslinking monomer, e.g. a polyfunctional (meth)acrylate, e.g. allyl methacrylate and, if appropriate, other monomers, e.g. from 0.0 wt.-% to 10.0 wt.-%, preferably from 0.5 wt.-% to 5.0% wt.-%, of $C_1$-$C_4$-alkyl methacrylates, such as ethyl acrylate or butyl methacrylate, preferably methyl acrylate, or other vinylically polymerizable monomers, e.g. styrene.

Further preferred impact modifiers are polymer particles which can have core-shell or core-shell-shell structures and are obtained by emulsion polymerization (see, for example, EP-A 0 113 924, EP-A 0 522 351, EP-A 0 465 049 and EP-A 0 683 028). The present invention typically requires suitable average particle diameter of these emulsion polymers in the range from 20 nm and 500 nm, preferably between 50 nm and 450 nm, more preferably between 150 nm and 400 nm and most preferably between 200 nm and 350 nm.

A three-layer or three-phase structure with a core and two shells can prepared as follows. The innermost (hard) shell can, for example, be composed of methyl methacrylate, of small proportions of comonomers, e.g. ethyl acrylate, and of a proportion of crosslinking agent, e.g. allyl methacrylate. The middle (soft) shell can, for example, be composed of a copolymer comprising butyl acrylate and, if appropriate, styrene, while the outermost (hard) shell is the same as the matrix polymer, thus bringing about compatibility and good linkage to the matrix. The proportion of polybutyl acrylate in the core or in the shell of the impact modifier of a two- or three-layer core-shell structure is decisive for the impact-modifying action and is preferably in the range from 20.0 wt.-% to 99.0 wt.-%, particularly preferably in the range from 30.0 wt.-% to 98.0 wt.-%, even more preferably in the range from 40.0 wt.-% to 97.0 wt.-%, based on the total weight of the impact modifier.

Thermoplastic impact modifiers have a different mechanism of action than particulate impact modifiers. They are generally mixed with the matrix material. In the case that domains are formed, as occurs, for example, in the case of use of block copolymers, preferred sizes for these domains, the size of which can be determined, for example, by electron microscopy, correspond to preferred sizes for the core-shell particles.

There are various classes of thermoplastic impact modifiers. One example thereof are aliphatic thermoplastic polyurethanes (TPUs) e.g. Desmopan® products commercially available from Covestro AG. For instance, the TPUs Desmopan® WDP 85784A, WDP 85092A, WDP 89085A and WDP 89051D, all of which have refractive indices between 1.490 and 1.500, are particularly suitable as impact modifiers.

A further class of thermoplastic polymers for use according to the present invention as impact modifiers are methacrylate-acrylate block copolymers, especially acrylic TPE, which comprises PMMA-poly-n-butyl acrylate-PMMA triblock copolymers, and which are e.g. commercially available under the Kurarity® product name by Kuraray. The poly-n-butyl acrylate blocks form nanodomains in the polymer matrix having a size between 10 nm and 20 nm.

The thermoplastic polymer for use in the present invention may comprise further conventional additives/adjuvants of any type. Among these are, inter alia, antistatic agents, antioxidants, moulding-release agents, flame retardants, lubricants, flow improvers, fillers, UV absorbing agents, light stabilizers and organophosphorus compounds, such as phosphites or phosphonates, pigments, agents providing weathering resistance and plasticizers. The choice and amounts of additives can be adjusted in accordance to the intended use. Thermal stability and weathering stability of the resulting coloured moulding composition should not be excessively impaired by these additives.

Process for manufacturing of a coloured moulding composition according to the invention can be carried out by conventional incorporation processes by combining, mixing and homogenising the thermoplastic polymer and the liquid composition or a masterbatch. The process can be carried out in the melt under the action of shear forces. Combining and mixing prior to melt homogenisation are optionally carried out using powder premixtures, in particular, if the colouring preparation is introduced as a component of a masterbatch.

The thermoplastic polymer and the masterbatches, the liquid composition or neat colouring preparation as obtained from the manufacturer can be combined, mixed, homogenised and then extruded in conventional devices such as screw-type extruders (for example twin-screw extruder, ZSK), kneaders, Brabender or Banbury mills. After the extrusion, the extrudate can be cooled and pelletized. It is also possible for individual components to be premixed and the remaining starting materials subsequently to be added separately and/or likewise as a mixture.

In yet a further embodiment the thermoplastic polymer can be provided in form of a hot melt and the liquid composition or the masterbatch is added thereto. This method is particularly advantageous for colouring of thermoplastic polymers directly after their manufacturing process.

When the thermoplastic polymer is a polyalkyl (meth) acrylate, the step b) typically is carried out in an extruder, preferably at a temperature ranging from 200° C. to 320° C., more preferably from 230° C. to 300° C. Since the moulding composition has an excellent thermal stability and no undesired formation of dark particles takes place at this stage. The coloured moulding composition of the present invention typically has melt volume flow rate MVR from 0.5 to 10.0 g/10 min, measured at 230° C. with a load of 3.8 kg according to ISO 1133 (2011). Hence, the coloured moulding composition comprising polyalkyl (meth)acrylate as a thermoplastic polymer can be advantageously used for injection moulding and for extrusion.

Further, the present invention is directed to a coloured moulding composition comprising a thermoplastic polymer and a monoazo dye, wherein the thermoplastic moulding composition is obtainable by the inventive process as described above.

Preferably, the coloured moulding composition comprises less than 100 ppm, preferably less than 50 ppm of aluminium or a compound thereof and less than 300 ppm, preferably less than 200 ppm of silicon or a compound thereof. The amount of aluminium or silicon is given here in wt.-ppm, based on the total weight of the coloured moulding composition.

Preferably, the coloured moulding composition has a melt flow rate from 0.5 to 10.0 g/10 min, measured at 230° C. with a load of 3.8 kg.

The coloured moulding composition preferably shows a light transmittance, TD65 according to DIN 5033-7 (2014) in the range of 40% to 93%, in particular in the range of 70% to 92%, measured at 23° C. on an injection moulded specimen having a thickness of 3 mm.

The concentration of the monoazo dye comprising at least one heteroaromatic moiety in the coloured moulding composition depends on the desired perceived colour. The concentration is generally in the range from 0.00001 to 5.0 wt.-% preferably from 0.0001 to 4.0 wt.-%, more preferably from 0.001 to 3.0 wt.-%, based on the weight of the coloured moulding composition. If further dyes are present, the sum of the dye concentrations is preferably in the range from 0.00001 to 5.0 wt.-% preferably from 0.0001 to 4.0 wt.-%, more preferably from 0.001 to 3.0 wt.-%, based on the weight of the coloured moulding composition.

In its further aspect, the present invention relates to a process for the manufacturing of a moulded part, wherein the process comprises a step of injection moulding of a coloured moulding composition. The process temperature normally ranges from 200° C. to 320° C., preferably from 230° C. to 300° C., wherein the coloured moulding composition is injected into a mould which can produce the moulded part, wherein the coloured moulding composition comprises a monoazo dye comprising at least one heteroaromatic moiety and the coloured moulding composition comprises less than 100 ppm, preferably less than 50 ppm of aluminium or a compound thereof and less than 300 ppm, preferably less than 200 ppm of silicon or a compound thereof.

The amount of aluminium and silicon is given above as wt.-ppm based on the total weight of the coloured moulding composition. For example, the contents of aluminium and silicon given in ppm means mg aluminium or silicon based on kg coloured moulding composition.

The temperature of the molten coloured moulding composition comprising e.g. polymethylmethacrylate (co) polymers during the inventive injection-moulding process is normally kept from 210 to 270° C., and still more preferably from 240 to 250° C., with no intended resultant restriction. Temperature of the injection-moulding nozzle is moreover preferably from 230 to 270° C., still more preferably from 240 to 250° C., and the temperature of the injection mould is preferably from 40 to 80° C. and still more preferably from 50 to 60° C. The temperature of the injection-moulding cylinder is preferably from 220 to 260° C. and still more preferably from 230 to 250° C. In the inventive process, the moulding composition is injected with a pressure in the range from 50 to 1000 bar into the mould. One particular embodiment here applies the pressure in stages, the pressure being 50 bar in the first stage and 400 bar in the second stage.

The injection rate may also be staged, being in the range from 0.01 m/s to 0.1 m/s in the first stage and from 0.1 m/s to 1 m/s in the second stage, and in the range from 0.05 m/s to 0.5 m/s in a possible third stage. The metering stroke here is preferably from 1 to 4 times the screw diameter.

Importantly, the process of the present invention is highly suitable for the manufacturing of complex moulded parts, such as those with variable thickness and/or with perforations. Thickness differences in the corresponding injection mould, and in particular perforations, i.e. regions around which the melt is injected within the mould, have a marked effect on the rheology of the material as it fills the mould cavity or cavities. For the purposes of the present invention, a complex moulded part is a moulded part which has one or more of the features described below.

In one embodiment of the inventive process, a complex moulded part has differing wall thicknesses. The moulded part obtained is preferably one whose wall thickness is in the range from 1 to 30 mm and may vary within the moulded part. By way of example, the variation in the wall thickness may be stated via the difference between minimum and maximum wall thickness of the moulded part, this difference being more than 1 mm, preferably more than 5 mm and particularly preferably more than 10 mm. The maximum-to-minimum wall thickness ratio is preferably in the range >1:20 and more preferably in the range >1:10, and is particularly preferably >1:4, and most preferably >1:2.

In another embodiment of the inventive process, a complex moulded part has at least one perforation. The wall thickness of the moulded part is zero at the site of a perforation. The moulded part composition surrounding a perforation may develop a uniform or varying wall thickness in the surrounding region, the wall thickness preferably being within the range stated above.

Another embodiment of the process described above produces a complex moulded part which has at least one non-planar surface. This surface is preferably of convex or concave design.

A further aspect of the present invention relates to process for the manufacturing of an extruded part, wherein the process comprises an extrusion process of a coloured moulding composition at a temperature ranging from 200° C. to 320° C., preferably from 230° C. to 300° C., wherein the coloured moulding composition is melted and die-casted to the final part, wherein the coloured moulding composition comprises a monoazo dye comprising at least one heteroaromatic moiety and
  the coloured moulding composition comprises
    less than 100 ppm, preferably less than 50 ppm of aluminium or a compound thereof and
    less than 300 ppm, preferably less than 200 ppm of silicon or a compound thereof.

Extrusion of thermoplastic polymers is widely known and is described for example in Kunststoffextrusionstechnik II [Plastics extrusion technology II], Hanser Verlag, 1986, p. 125 ff. In the method according to the invention, a hot melt is extruded from the nozzle of the extruder onto a gap between two calendar rolls. The optimum temperature of the melt depends for example on the composition of the mixture and can therefore vary in wide ranges. For instance, if the thermoplastic polymer is a polyalkyl (meth)acrylate, preferred temperatures at the nozzle entry lie in the range of from 150 to 300° C., particularly preferably in the range of from 180 to 270° C. and more particularly preferably in the range of from 200 to 220° C. The temperature of the calendar rolls is preferably less than or equal to 150° C., preferably between 60° C. and 140° C.

Test Methods

Determination of the TGA of Colouring Preparations

The isothermal thermogravimetric analysis was carried out by means of an automatic thermal balance Q5000 IR from TA Instruments with a heating rate of 5 K/min up to 260° C. and subsequent isothermal analysis at 260° C. for 15 min. The samples were dried to a constant mass in a drying oven before an analysis by TGA. In the case of bead polymers as dispersing aids, the TGA was carried out on the solid bead polymer.

Content of Aluminium and Silicon

Content of aluminium and silicon in samples was determined using the following procedure:

The samples were digestion mineralized using a microwave pressure digestion system MARS 5 PLUS/MARS 6 and then analysed using an atomic emission spectrometer iCAP™ 7400 ICP-OES Analyzer, available from ThermoFischer Scientific.

The content of aluminium and silicon is given as weight ppm (wt.-ppm), calculated on the weight of aluminium or silicon.

Manufacturing of Specimen

In each example, two separate specimens having a thickness of 3 mm were injection moulded at 260° C. and 290° C. on Arburg Allrounder 320 C, available from ARBURG GmbH & Co KG, Lossburg, under the following conditions:
  Injection time: 0.92 sec
  Material temp.: 250° C.
  Cylinder temp.: 250 to 220° C.
  Mould temp.: 70° C.
  Switch from injection to hold pressure at internal mould pressure 600 bar
  Total cycle time: 40 sec
  Injection moulding with closed venting cylinder.

The colour measurement was carried out using a spectral photometer Color Eye 7000 A, obtainable from X-Rite Inc, Grand Rapids United States. Subsequently, the colour coordinates (L, a* and b*) of the specimen were measured using a spectral photometer according to the standard DIN 5033 (2017), Parts 1~4 and the colour difference ΔE CIELAB 1976 ($D_{65}$, 10°) of each sample was determined according to the standard DIN 6174. Specimens having Δ E above 0.7 were evaluated as those having a low thermal stability, specimens having Δ E between 0.1 and 0.7 were evaluated as those with a good thermal stability and specimens having Δ E lower than 0.1 were evaluated as those with an excellent thermal stability.

EXAMPLES

Coloured moulding compositions of Examples 1 to 3 were produced in the following manner:

Polymer granules and colouring preparation as received from the manufacturer were used in a tumbling mixer to produce a mixture which was metered by means of a funnel into the feed zone of a single-screw extruder 30 ESE from Herbert Stork Maschinenbau GmbH, Mörfelden. Extrusion took place at 250° C. The venting zones were attached to a vacuum pump. A granulator was connected downstream of the extruder.

In a second processing step, specimens were injection-moulded from the granules thus obtained.

Example 1 (Comparative)

The sample of Solvent Red 195 was purchased from a commercial manufacturer and used without any purification. The material contained 110 ppm aluminium, less than 15 ppm silicon and had a mass loss in dried form of 7.4 wt.-%.

Solvent Red 195 is a mono azo solvent dye having a heterocyclic moiety. The material is commercially obtainable from several manufacturers in different purities and, optionally, with minor amounts of additives.

Polymethyl methacrylate PLEXIGLAS® 7H, commercially available from Röhm GmbH, was used as a thermoplastic material. The obtained coloured moulding composition contained 0.01 wt.-% Solvent Red 195.

Δ E of the specimen was 1.3 which indicates a low thermal stability.

Example 2 (Comparative)

The sample of Solvent Red 195 was purchased from a commercial manufacturer and used without any purification.

The material contained less than 15 ppm aluminium, 370 ppm silicon and had a mass loss in dried form of 6.2 wt.-%.

Polymethyl methacrylate PLEXIGLAS® 7H, commercially available from Röhm GmbH, was used as a thermoplastic material. The obtained coloured moulding composition contained 0.01 wt.-% Solvent Red 195.

Δ E of the specimen was 0.74 which indicates a relatively low thermal stability.

Example 3 (Inventive)

A high-purity sample Solvent Red 195 was used. The material contained less than 15 ppm aluminium, less than 15 ppm silicon and had a mass loss in dried form of 3.0 wt.-%.

Polymethyl methacrylate PLEXIGLAS® 7H, commercially available from Röhm GmbH, was used as a thermoplastic material. The obtained coloured moulding composition contained 0.01 wt.-% Solvent Red 195.

Δ E of the specimen was 0.33 which indicates a good thermal stability. No undesired black dots were formed.

Example 4 (Comparative)

Coloured moulding compositions of Examples 4 and 5 were produced in the following manner:

Polymer granules were metered by means of a funnel into the feed zone of a single-screw extruder 30 ESE from Herbert Stork Maschinenbau GmbH. The liquid colouring preparation was introduced into the extruder after the 2nd vent zone at a temperature ranging from 240° C. to 260° C. The venting zones were attached to a vacuum pump. A granulator was connected downstream of the extruder.

In a second processing step, specimens were injection-moulded from the granules thus obtained.

Liquid Colorant Composition:
 31.3% wt.-% Solvent Red 195*
 8.1 wt.-% MACROLEX® Yellow G
 16.7 wt.-% DISPEX® Ultra 4550
 0.07 wt.-% EBOTEC® MT 15
 0.6 wt.-% BYK 024
 43.23 wt.-% water
 * the sample was purchased from a manufacturer and used without any purification. The material contained 110 ppm aluminium, less than 15 ppm silicon and had a mass loss in dried form of 7.4 wt.-%.

Polymethyl methacrylate PLEXIGLAS® 8N, commercially available from Röhm GmbH, was used as a thermoplastic material. The coloured moulding composition was prepared from a mixture comprising 99.932 wt.-% PLEXIGLAS® 8N and 0.068 wt.-% of the liquid colorant composition.

A significant formation of undesired black particles took place during the colouring process.

Example 5 (Inventive)

Liquid Colorant Composition:
 31.3% wt.-% Solvent Red 195*
 8.1 wt.-% MACROLEX® Yellow G
 16.7 wt.-% DISPEX® Ultra 4550
 0.07 wt.-% EBOTEC® MT 15
 0.6 wt.-% BYK 024
 43.23 wt.-% water
 * a high-purity sample. The material contained less than 15 ppm aluminium, less than 19 ppm silicon and had a mass loss in dried form of 2.8 wt.-%.

Polymethyl methacrylate PLEXIGLAS® 8N, commercially available from Röhm GmbH, was used as a thermoplastic material. The coloured moulding composition was prepared from a mixture comprising 99.932 wt.-% PLEXIGLAS® 8N and 0.068 wt.-% of the liquid colorant composition.

No formation of undesired black dots took place during colouring process and injection moulding.

The invention claimed is:

1. A process for manufacturing a coloured moulding composition, the process comprising:
 a) providing a thermoplastic polymer; and
 b) adding to the thermoplastic polymer from a), a colouring preparation or a liquid composition or a masterbatch comprising said colouring preparation,
 wherein the colouring preparation comprises a monoazo dye comprising at least one heteroaromatic moiety; and
 wherein the colouring preparation comprises
 less than 100 ppm of aluminium or a compound thereof, and
 less than 300 ppm of silicon or a compound thereof; and
 wherein the colouring preparation has mass loss in dried form of 0.0 to 5.0 wt. % in isothermal thermogravimetric analysis at 260° C. for 15 min.

2. The process according to claim 1, wherein the liquid composition added in b) comprises, based on a weight of the liquid composition:
 from 1.0 to 30.0 wt.-% of a dispersing additive,
 from 0.5 to 50.0 wt.-% of the monoazo dye,
 from 0.0 to 50.0 wt.-% of auxiliary additives, and
 liquid,
 wherein portions by weight of components of the liquid composition add up to 100 wt.-%.

3. The process according to claim 1, wherein the masterbatch added in b) comprises, based on a weight of the masterbatch:
 from 0.01 to 50.0 wt.-% of the monoazo dye,
 from 50.0 to 99.99 wt.-% of the thermoplastic polymer,
 from 0.0 to 10.0 wt.-% of auxiliary additives, and
 from 0.0 to 10.0 wt.-% of further colourants,
 wherein portions by weight of components of the masterbatch add up to 100 wt.-%.

4. The process according to claim 1, wherein the monoazo dye is at least one selected from the group consisting of
 5-[(3,4-dichlorophenyl) azo]-1,2-dihydro-6-hydroxy-1,4-dimethyl-2-oxonicotinonitrile,
 2,3-dihydro-2,2-dimethyl-6-((4-(phenylazo)-1-naphthyl)azo)-1H-perimidin,
 cyano-S-[[5-cyano-2,6-bis[(3-methoxypropyl)amino]-4-methylpyridin-3-yl]azo]-3-methyl-2-thiophenecarboxylic acid methyl ester,
 5-methyl-2-phenyl-4-phenylazo-4H-pyrazol-3-one,
 4-[(2,4-dimethylphenyl) azo]-2,4-dihydro-5-methyl-2-phenyl-3H-pyrazol-3-one,
 3-[(1-oxonaphthalen-2-ylidene)methylhydrazinylidene]-1-prop-2-enylindol-2-one,
 4-((o-methoxyphenyl)azo)-3-methyl-1-phenyl-2-pyrazolin-5-one, and
 5-methyl-2-phenyl-4-phenylazo-4H-pyrazol-3-one.

5. The process according to claim 1, wherein the thermoplastic polymer is selected from the group consisting of polyalkyl (meth)acrylate, polymethylmethacrylimide, polymethyl methacrylate copolymer, polystyrene, polystyrene copolymer, acrylonitrile copolymer, polycarbonate, polyester, polyamide, polyvinylidene fluoride, and a mixture thereof.

6. The process according to claim 1, wherein the thermoplastic polymer comprises a polymer matrix and scattering particles dispersed in said polymer matrix,
wherein the scattering particles have a weight average particle diameter of from 0.01 µm to 100.0 µm, and a refractive index of the scattering particles differs from that of the polymer matrix by at least 0.01.

7. The process according to claim 1, wherein the thermoplastic polymer comprises at least one impact modifier selected from the group consisting of particulate impact modifier and thermoplastic impact modifier.

8. The process according to claim 1, wherein the colouring preparation has a mass loss in dried form of from 0.01 to 4.0 wt. %, in isothermal thermogravimetric analysis at 260° C. for 15 min.

9. The process according to claim 1, wherein b) is carried out in an extruder.

10. The process according to claim 1, wherein the thermoplastic polymer is polymethyl methacrylate having a weight average molecular weight Mw of from 80,000 g/mol to 180,000 g/mol and is obtainable by polymerization of a polymerizable composition whose polymerizable constituents comprise, based on a weight of the polymerizable composition:
(i) from 50.0 to 99.9 wt.-% of methyl methacrylate,
(ii) from 0.1 to 50.0 wt.-% of an acrylic acid ester of a $C_1$-$C_4$ alcohol, and
(iii) from 0.0 to 30.0 wt.-% of at least one further monomer copolymerizable with monomers (i) and (ii).

11. The process according to claim 1, wherein the masterbatch or the liquid composition added in b) further comprises
at least one further dye selected from the group consisting of perinone dye, quinophthalone dye, and anthraquinone dye;
at least one inorganic pigment;
at least one phthalocyanine pigment; or
any mixture of the above.

12. A coloured moulding composition, comprising a thermoplastic polymer and a monoazo dye, wherein the coloured moulding composition is obtainable by the process according to claim 1.

13. The coloured moulding composition according to claim 12, comprising:
less than 100 ppm of aluminium or a compound thereof, and
less than 300 ppm of silicon or a compound thereof.

14. The coloured moulding composition according to claim 12, wherein the coloured moulding composition has a melt flow rate from 0.5 to 10.0 g/10 min, measured at 230° C. with a load of 3.8 kg.

15. A process for the manufacturing of a moulded part, the process comprising:
injection moulding the coloured moulding composition according to claim 12 at a temperature ranging from 200° C. to 320° C., into a mould which can produce the moulded part,
wherein the coloured moulding composition comprises the monoazo dye comprising at least one heteroaromatic moiety, and
wherein the coloured moulding composition comprises less than 100 ppm of aluminium or a compound thereof, and
less than 300 ppm of silicon or a compound thereof.

16. A process for the manufacturing of an extruded part, the process comprising:
extruding the coloured moulding composition according to claim 12 at a temperature ranging from 200° C. to 320° C., wherein the coloured moulding composition is melted and die-casted to the extruded part,
wherein the coloured moulding composition comprises the monoazo dye comprising at least one heteroaromatic moiety, and
wherein the coloured moulding composition comprises less than 100 ppm of aluminium or a compound thereof, and
less than 300 ppm of silicon or a compound thereof.

17. The process according to claim 15, wherein the moulded part has different wall thicknesses, one or more perforations, at least one non-planar surface, or a combination of these features.

18. A moulded part, obtainable by the process according to claim 15.

19. An extruded part, obtainable by the process according to claim 16.

20. The process according to claim 1, wherein the colouring preparation comprises less than 50 ppm of aluminium or a compound thereof, and less than 200 ppm of silicon or a compound thereof.

* * * * *